US012585994B2

(12) United States Patent
Hwang et al.

(10) Patent No.: US 12,585,994 B2
(45) Date of Patent: Mar. 24, 2026

(54) ACCURATE AND EFFICIENT INFERENCE IN MULTI-DEVICE ENVIRONMENTS

(71) Applicant: QUALCOMM Incorporated, San Diego, CA (US)

(72) Inventors: Kyu Woong Hwang, Daejeon (KR); Seunghan Yang, Incheon (KR); Hyunsin Park, Gwangmyeong (KR); Leonid Sheynblat, Hillsborough, CA (US); Vinesh Sukumar, Fremont, CA (US); Ziad Asghar, San Diego, CA (US); Justin McGloin, Los Altos, CA (US); Joel Linsky, San Diego, CA (US); Tong Tang, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 797 days.

(21) Appl. No.: 17/935,067

(22) Filed: Sep. 23, 2022

(65) Prior Publication Data

US 2024/0104420 A1 Mar. 28, 2024

(51) Int. Cl.
| | |
|---|---|
| *G06N 20/00* | (2019.01) |
| *G06F 18/23* | (2023.01) |
| *G06N 5/04* | (2023.01) |

(52) U.S. Cl.
CPC .............. *G06N 20/00* (2019.01); *G06F 18/23* (2023.01); *G06N 5/04* (2013.01)

(58) Field of Classification Search
CPC ........... G06N 20/00; G06N 5/04; G06F 18/23
See application file for complete search history.

(56) References Cited

U.S. PATENT DOCUMENTS

2021/0089921 A1* 3/2021 Aghdasi ................... G06N 5/04

OTHER PUBLICATIONS

Georgiev, Petko, Sourav Bhattacharya, Nicholas D. Lane, and Cecilia Mascolo. "Low-resource multi-task audio sensing for mobile and embedded devices via shared deep neural network representations." Proceedings of the ACM on Interactive, Mobile, Wearable and Ubiquitous Technologies 1, No. 3 (2017): 1-19 (Year: 2017).*

(Continued)

*Primary Examiner* — Casey R. Garner
(74) *Attorney, Agent, or Firm* — Patterson & Sheridan LLP

(57) ABSTRACT

Certain aspects of the present disclosure provide techniques and apparatus for a training and using machine learning models in multi-device network environments. An example computer-implemented method for network communications performed by a host device includes extracting a feature set from a data set associated with a client device using a client-device-specific feature extractor, wherein the feature set comprises a subset of features in a common feature space, training a task-specific model based on the extracted feature set and one or more other feature sets associated with other client devices, wherein the feature sets associated with the other client devices comprise one or more subsets of features in the common feature space, and deploying, to each respective client device of a plurality of client devices, a respective version of the task-specific model.

30 Claims, 11 Drawing Sheets

100

(56)  References Cited

OTHER PUBLICATIONS

Han, Song, Jeff Pool, John Tran, and William Dally. "Learning both weights and connections for efficient neural network." Advances in neural information processing systems 28 (2015). (Year: 2015).*

Gong, Yunchao, Liu Liu, Ming Yang, and Lubomir Bourdev. "Compressing deep convolutional networks using vector quantization." arXiv preprint arXiv:1412.6115 (2014). (Year: 2014).*

International Search Report and Written Opinion—PCT/US2023/070755—ISA/EPO—Oct. 12, 2023.

Wang F., et al., "Communication-Efficient and Privacy-Preserving Feature-based Federated Transfer Learning," Globeom 2022, 2022 IEEE Global Communications Conference, (Online), Sep. 12, 2022, 10 Pages, XP093087261, abstract, p. 1 to p. 9.

Xu W., et al., "Accelerating Federated Learning for IoT in Big Data Analytics With Pruning, Quantization and Selective Updating," IEEE Access, IEEE, USA, vol. 9, Mar. 2, 2021, pp. 38457-38466, XP011841925, The Whole Document.

* cited by examiner

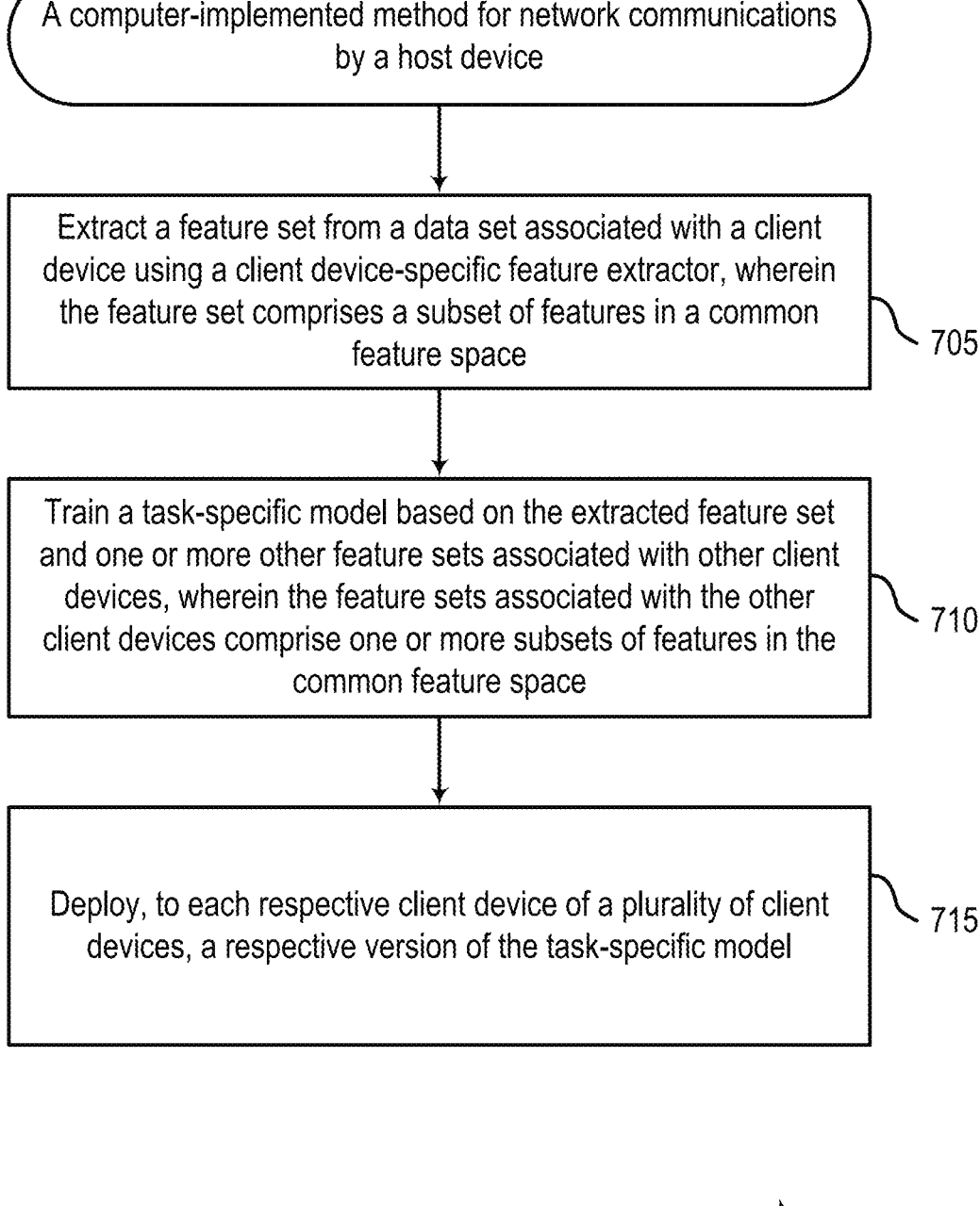

A computer-implemented method for network communications by a host device

Extract a feature set from a data set associated with a client device using a client device-specific feature extractor, wherein the feature set comprises a subset of features in a common feature space ⟍ 705

Train a task-specific model based on the extracted feature set and one or more other feature sets associated with other client devices, wherein the feature sets associated with the other client devices comprise one or more subsets of features in the common feature space ⟍ 710

Deploy, to each respective client device of a plurality of client devices, a respective version of the task-specific model ⟍ 715

ACCURATE AND EFFICIENT INFERENCE IN MULTI-DEVICE ENVIRONMENTS

INTRODUCTION

Aspects of the present disclosure relate to machine learning models used in multi-device environments.

In many computing environments, many different types of devices can perform similar tasks. For example, devices such as smartphones, wearable devices, Internet of Things (IoT) devices, desktop computers, laptop computers, tablets, connected home devices, and the like can include components that allow for voice commands to be captured and processed in order to trigger execution of one or more actions on these devices or with respect to other devices in a network. These devices, however, may have different input components that capture data differently and may have different processing capabilities that influence how these devices can process the captured data. For example, a smartphone or a tablet computer with multiple processors may be able to process input data using one or more machine learning models more quickly and more accurately (e.g., using a larger number of quantization bins, larger data types, etc.) than a wearable device or IoT device having a less capable processor. Further, even across the same type of device, different models of devices may have data capture components that capture data at varying quality levels. For example, a high-end device may be able to capture audio content at CD quality (e.g., using 16 bits and a 44.1 kHz sampling rate) with a microphone that can capture the audible range of frequencies (e.g., frequencies between 20 Hz and 20 kHz), while a lower-end device may capture audio content at lower quality (e.g., using a smaller number of bits and/or a lower sampling rate) with a microphone that captures a smaller range of frequencies (e.g., frequencies between 80 Hz and 255 Hz, corresponding to a range between the low and high ends of human speech audio frequency).

Further, different devices may be deployed in different scenarios. For example, a mobile phone may be used in various environments with different ambient noise (e.g., wind) characteristics, while devices in a motor vehicle may be used in environments with relatively consistent ambient noise (e.g., wind, road noise, etc.) characteristics. In another example, devices such as an internet-enabled smart device in a home may operate in an environment with little noise, or sporadic background noise at different times. Because different devices may be deployed in different scenarios, a single machine learning model may not accurately process the captured data and trigger execution of the appropriate actions based on the results of processing the captured data on these devices.

Accordingly, techniques are needed for accurately performing inferences using machine learning models

BRIEF SUMMARY

Certain aspects provide a computer-implemented method for network communications by a host device. The method generally includes extracting a feature set from a data set associated with a client device using a client-device-specific feature extractor, wherein the feature set comprises a subset of features in a common feature space; training a task-specific model based on the extracted feature set and one or more other feature sets associated with other client devices, wherein the feature sets associated with the other client devices comprise one or more subsets of features in the common feature space; and deploying, to each respective client device of a plurality of client devices, a respective version of the task-specific model.

Other aspects provide a method for a computer-implemented method for network communications by a client device. The method generally includes transmitting, to a host device, a data set associated with the client device, receiving a version of a task-specific model trained based on at least a feature set extracted from the transmitted data set, receiving an input for processing, generating an inference based on the received input and the received version of the task-specific model, and performing one or more actions based on the inference.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain features of various aspects of the present disclosure and are therefore not to be considered limiting of the scope of this disclosure.

FIG. 7 depicts example operations which may be performed for training machine learning models for multiple client devices in a network, in accordance with aspects of the present disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
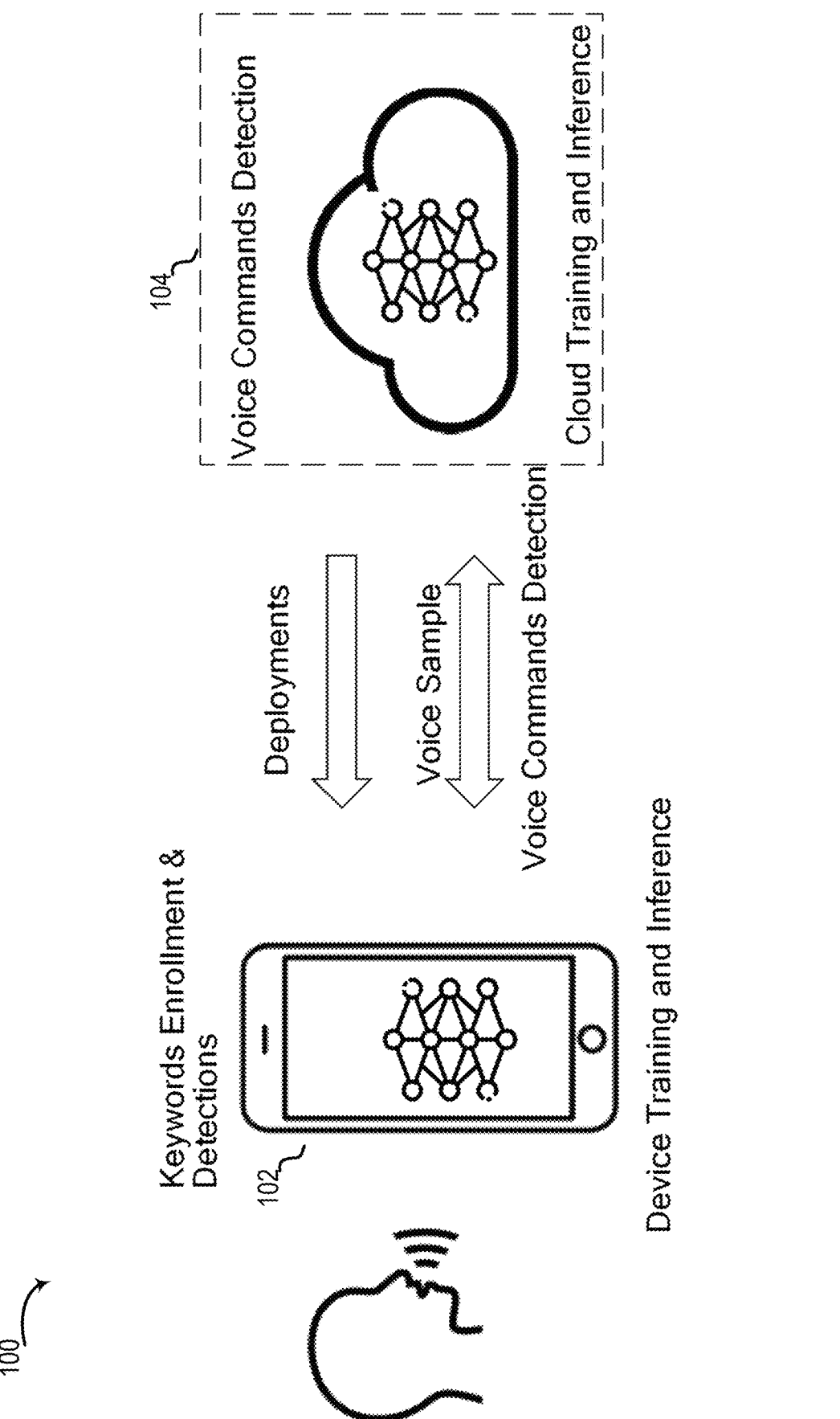
FIG. 1 depicts an example network environment in which multi-device inference is performed.

Aspects of the present disclosure provide apparatuses, methods, processing systems, and computer-readable mediums for training and using machine learning models to perform inferences on devices with varying capabilities in a networked environment.

In many networked environments, such as an environment in which multiple devices communicate via a wireless communications network, many devices with differing capabilities may be deployed. Because these devices have differing capabilities, training and deploying machine learning models to process inputs gathered by these devices may be a computationally complex and resource intensive process. For example, different machine learning models may be trained for different devices, even though these models may ultimately be trained to perform the same task. However, because there may be an intractable number of combinations of deployment scenarios and device types (e.g., high-end devices that are capable of high-resolution data capture, low-end devices that are capable of low-resolution data capture, and devices with capabilities in between those of the high-end devices and low-end devices), it may not be possible to generate machine learning models for each of these types of devices and deployment scenarios that will accurately process input data captured by devices deployed in a networked environment.

Because multiple devices may exist in any given environment, however, multiple devices may capture data from a same input source. For example, assume that a smartphone and a connected home device are located in the same room. Both of these devices may record a same input from a same source (e.g., a user saying a voice command to instantiate a particular operation within the networked environment). Because these devices, deployed in the same environment, may capture input data from the same source, these devices can collaborate in order to accurately process input data captured in this environment.

Aspects of the present disclosure provide techniques and apparatus for training and using machine learning models to accurately process input data in a multi-device environment. As discussed in further detail herein, a host device may be trained with data from multiple types of client devices and may extract features from data received from these client devices using client-device-specific feature extractors that extract device-agnostic features. By doing so, the machine learning model can be trained to extract features in the same feature space from input data having differing characteristics, and inferences generated by the machine learning model can be generated based on features in a common space instead of features in unique feature spaces for each different type of device and environment in which these devices are deployed. Because the machine learning models described herein are trained based on data in a common space, the computational expense of training a machine learning model to perform inference operations on various devices or using inputs from various devices may be reduced. Further the accuracy of these inferences may be improved, as inferences may be generated using a machine learning model trained on a large set of data in a common space instead of multiple smaller sets of data from different spaces.

Example Inferencing in Multi-Device Network Environments with Multiple Devices FIG. 1 depicts an example network environment 100 in which inferences are performed using a machine learning model and data captured by various devices in the network environment.

As illustrated, in network environment 100, one or more client devices 102 (though, for simplicity, only one client device 102 is illustrated) and one or more host devices in cloud environment 104 can participate in training and inference operations using machine learning models. Generally, the host devices in cloud environment 104 may have more computing capability than the client devices 102 in network environment 100; for example, host devices in cloud environment 104 may include a significantly larger number of processing units (e.g., central processing units (CPUs) or other general purpose processors, graphics processing units (GPUs), digital signal processors (DSPs), and/or other specialized processors) that are more powerful (e.g., can support a larger number of operations per second) than the processing units installed at client devices 102. Thus, in many cases, the host devices in cloud environment 104 can train a common model that can be used across devices (though with varying accuracy, depending on the capabilities of any given device and the environments in which these devices are deployed) and deploy this model to either the host device or, as illustrated, the one or more client devices 102. In some cases, user enrollment to allow a machine learning model to be used by a specific user of a client device 102 and refinement of a machine learning model may be performed on a client device 102, as user enrollment and refinement may be operations that are less computationally complex, and thus use fewer compute resources, than initial training of a machine learning model from a training data set. In some aspects, the client devices 102 in network environment 100 may not be fixed and may be selected based on various parameters, such as capabilities of these client devices 102, a power state of these client devices 102, and the like.

After the machine learning model is deployed (e.g., to one or both of a client device 102 or a host device in cloud environment 104), input data to be processed using these machine learning models may be captured at the client device 102. For example, as illustrated in FIG. 1, the client device 102 can capture a recording of a user's vocal command. This recording (e.g., raw audio data) or feature data extracted from the raw audio data (e.g., mel-frequency cepstrum coefficients (MFCCs)) can be processed using a model at either or both of client device 102 or host device in cloud environment 104 in order to detect keywords in the recording and trigger execution of one or more operations at the client device based on the detected keywords.

As discussed, the client devices 102 in network environment 100 may have varying capabilities and may be deployed in different environments. Thus, a common model trained by a host device in cloud environment 104 may not be performant (e.g., may have poor inference performance, or differing inference performance on different devices). These performance issues may be caused, in part, due to the fact that each client device 102 generates data with different characteristics as a result of the capabilities of these devices and the environment in which these devices are deployed.

To improve the performance of machine learning models deployed in multi-device environments, aspects of the present disclosure provide techniques and apparatus that allow for features in a common feature space to be extracted from data captured by different devices in different environments. In extracting data into a common feature space and using data in this common feature space in training a machine learning model and generating inferences for captured input data, aspects of the present disclosure may allow for accurate inferencing on different client devices without the computational expense of training multiple models (e.g., for different devices and deployment scenarios).

Figure 2:
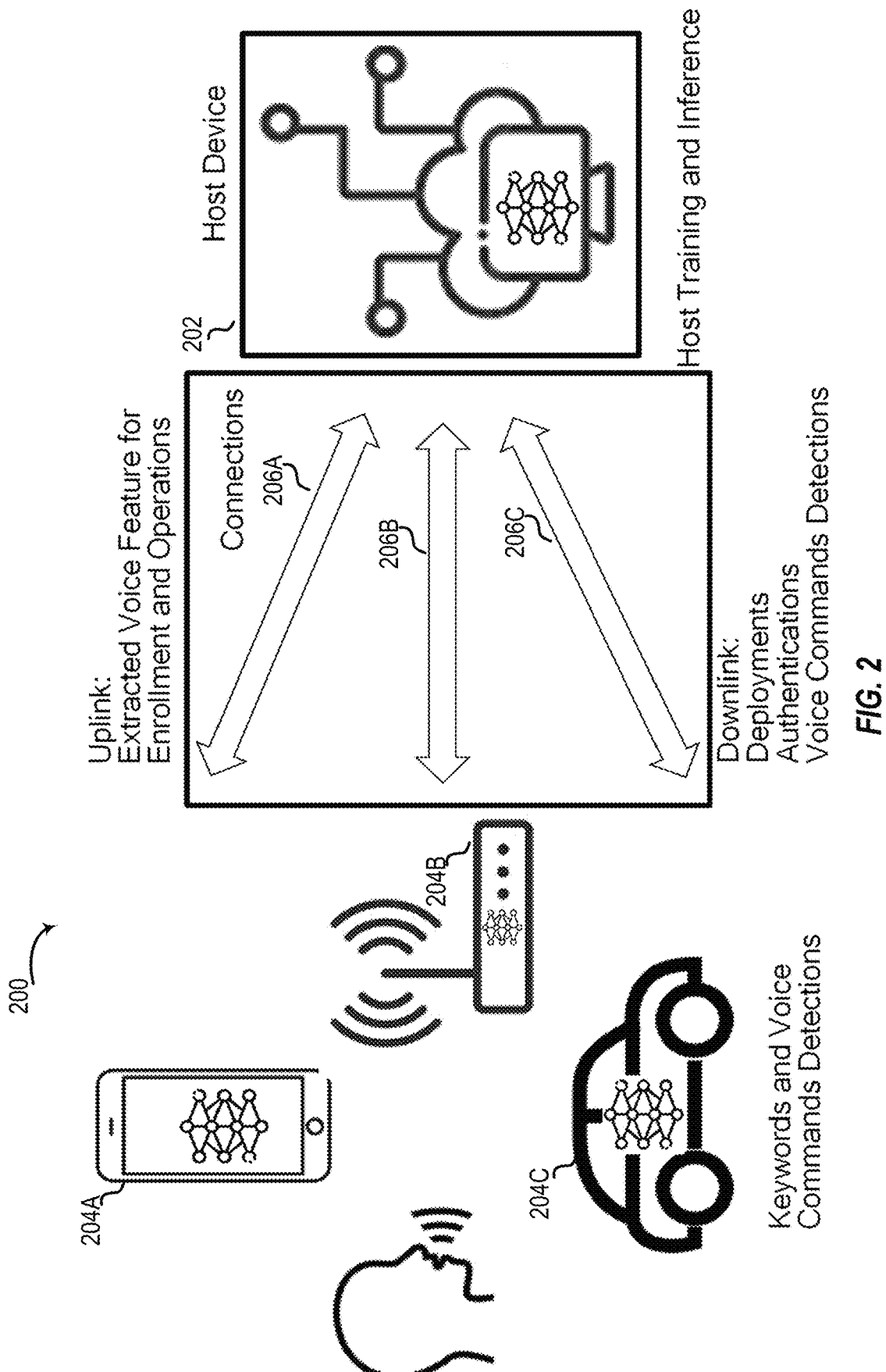
FIG. 2 depicts an example multi-device environment in which machine learning models are trained and used to generate inferences in a multi-device network based on features in a common feature space extracted from data captured by a variety of client devices, in accordance with aspects of the present disclosure.

FIG. 2 depicts an example multi-device environment 200 in which machine learning models are trained and used to generate inferences in a multi-device network based on features in a common feature space extracted from data captured by a variety of client devices, in accordance with aspects of the present disclosure.

As illustrated, environment 200 includes a host device 202 and one or more client devices 204, each of which is communicatively connected with host device 202 via a connection 206. Host device 202 is generally configured to train a machine learning model based on features in a common space extracted from input data from client device 204 using device-specific feature extractors, as discussed in further detail below. In some aspects, host device 202 may also process input data (e.g., voice recordings) in order to generate inferences using the trained machine learning model and may re-train the machine learning model and/or device-specific feature extractors based on inferences generated from input data received from the client devices 204.

In some aspects, client devices 204 may represent a subset of devices that belong to a trusted ecosystem. A trusted ecosystem may include, for example, devices produced or having components produced by a specific manufacturer, devices associated with specific users, or the like. Generally, client devices 204 belonging to a trusted ecosystem may participate in the training and use of a machine learning model as discussed herein, and other client devices that do not belong to the trusted ecosystem may not participate in the training and use of a machine learning model as discussed herein. In some aspects, client devices 204 that are trusted devices may enroll with the host device 202 (e.g., via an authentication procedure that authenticates these devices and verifies that these devices are part of a trusted ecosystem). In such a case, client devices that are not enrolled with host device 202 may not participate in the training and use of a machine learning model as discussed herein, but client devices 204 that are enrolled with host device 202 can participate in the training and use of a machine learning model as discussed herein.

Generally, connections 206 may be bidirectional communications connections between the host device 202 and client devices 204. For example, as illustrated, a communication link may exist between the host device 202 and each respective client device 204 in environment 200, such that client device 204A communicates with host device 202 via connection 206A, client device 204B communicates with host device 202 via communication link 206B, and client device 204C communicates with host device 202 via communication link 206C. In one example, as illustrated, uplink channels between a client device 204 and host device 202 may carry features in the common feature space extracted from an input captured at the client device 204 for enrollment and processing using the machine learning model deployed at host device 202. Downlink channels between a host device 202 and client device 204 may carry models to be deployed locally at the client device 204 (e.g., for detection of keywords in captured voice samples that trigger execution of defined functions). The downlink channels may further carry information generated by the machine learning model deployed at host device 202 for a given input, such as authentication information, information identifying commands to be executed at a client device 204, and the like.

As illustrated, many different types of devices may exist in environment 200. For example, environment 200 may include a client device 204A (illustrated as a smartphone), client device 204B (illustrated as edge device), client device 204C (illustrated as a vehicle), and other devices (not illustrated). Because each of these devices has different capabilities and capture components, and because a user (or other data source) may not be located equidistant from each of these devices, client devices 204A, 204B, and 204C may capture different data for the same input. For example, the data captured at a client device 204 closer in proximity to the user (or other data source) might be louder or otherwise have greater fidelity than data captured at a client device 204 further away from the user (or other data source). Further, the fidelity of captured data may also vary based on the capabilities of the capture components at each of these client devices; for example a lower-cost device, such as an infrastructure device (e.g., client device 204B), might have capture components with fewer capabilities than a higher-cost device, such as client devices 204A (a smartphone) or 204C (a vehicle), and thus may not be able to generate an inference that is as accurate as either of client devices 204A, 204C for a given input.

To compensate, or at least adjust, for differences in the inputs captured by multiple client devices 204 in a multi-device environment 200, features used as inputs into a machine learning model may be extracted from the inputs captured by these client devices, and these features may be located in the same feature space. By extracting features from inputs captured by different sources into a same feature space, a common machine learning model can be used to accurately generate inferences for such data. Further, as discussed in further detail below, correlations between the features extracted by different devices in environment 200 and the resulting inferences generated by these devices can be used to refine the machine learning models deployed at host device 202 and client device 204, which may further improve inference accuracy for inferences generated by each of the client devices in environment 200.

Figure 3:
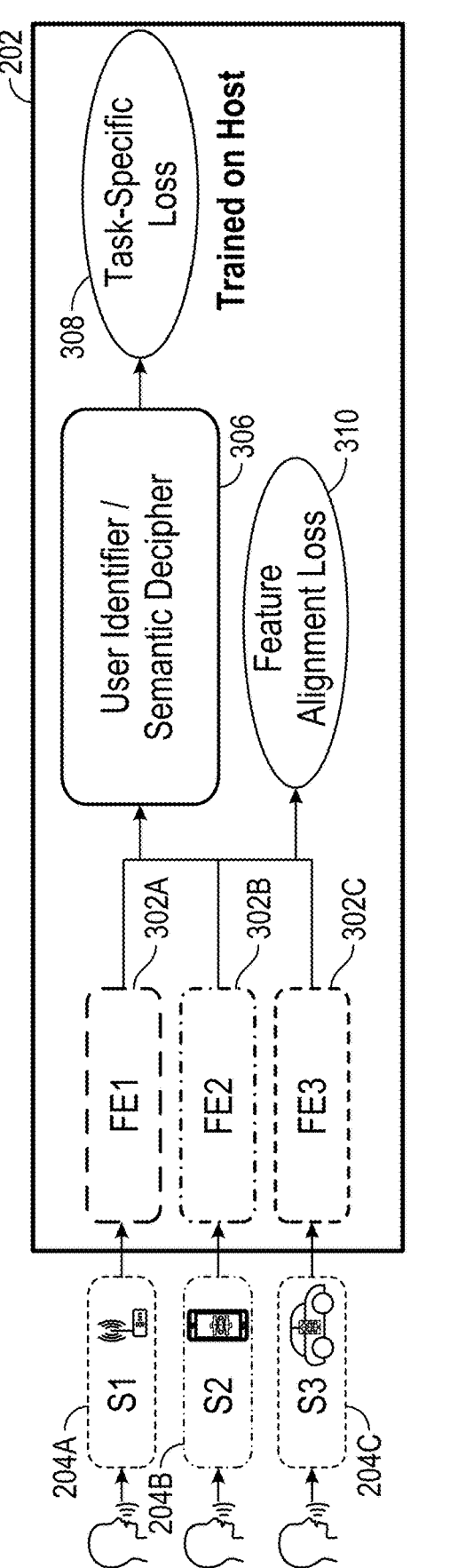
FIG. 3 depicts a pipeline for multi-device inferencing using a machine learning model and features in a common feature space extracted from data from different client devices in a multi-device network, in accordance with aspects of the present disclosure.

FIG. 3 depicts an example pipeline 300 for multi-device inferencing using a machine learning model and features in a common feature space extracted from data from different client devices, in accordance with aspects of the present disclosure.

Pipeline 300 generally allows for client devices 304 (and the users thereof) to provide information to host device 202 to train and use machine learning models based on features in a common features space. As illustrated, pipeline 300 includes a plurality of device-specific feature extractors 302, each of which may be associated with a specific client device 204 in a multi-device network environment. Generally, a device-specific feature extractor 302 is trained to extract features, located in a common feature space, from input data associated with (e.g., captured by) the client device 204 (e.g., from corresponding users of these client devices) with which the device-specific feature extractor 302 is associated. Because the device-specific feature extractor 302 extracts features in a common feature space from an input, each of feature extractors 302A, 302B, and 302C may thus be trained to generate data that is device-agnostic and, in some cases, environment-agnostic. Thus, a machine learning model may be trained at host device 202 using data in the same feature space instead of disparate data in a variety of spaces, which may reduce the likelihood that the model will be overfit to a specific scenario (e.g., a specific device from which a majority of data is received, at the expense of inference accuracy for data captured by other devices in the environment) or under fit for a broad variety of scenarios (e.g., generates the same or similar inferences for data captured by different devices in different environments, when such similarity in inference output is not warranted).

For example, in an environment where devices 204 perform inferences based on audio data captured by devices 204, the device-specific feature extractors 302 allow for the audio data captured by these client devices 204 to be mapped to similar or the same features regardless of the quality of the audio data captured by these devices 204. In doing so, the device-specific feature extractors 302 effectively normalize the captured audio data across these devices 204. By normalizing the input data and mapping input data to the same feature space, the machine learning models discussed herein may generate accurate inferences for any device 204 in a multi-device network environment.

As illustrated, the features in the common feature space extracted by the device-specific feature extractors 302 may be input into a user identifier/semantic decipherer 306, which may, for example, implement one or more machine learning models to authenticate a user of a client device 204 and/or decipher an input voice recording to identify one or more functions to be invoked and executed at host device 202 or client device 204. The machine learning models implemented in user identifier/semantic decipherer 306 may be trained to minimize, or at least reduce, a task-specific loss at block 308, which may be defined in relation to specific tasks to be performed on one or both of host device 202 or client devices 204. The task-specific loss minimized (or at least reduced) at block 308 may differ for different applications of the machine learning models deployed at host device 202. For example, a first task-specific loss may be defined for user vocal authentication, while a second task-specific loss may be defined for triggering various functions to be executed at host device 202 and/or client devices 204.

A feature alignment loss calculated at block 310 may be used to train the feature extractors 302 to extract a set of features in a common feature space from inputs generated by the client devices 204 with which each feature extractor 302 is associated. Generally, the feature alignment loss calculated at block 310 may allow the feature extractors 302 to compensate, or at least adjust, for specific properties of each client device 204 and the environment in which these client devices 204 are deployed.

Figure 4:
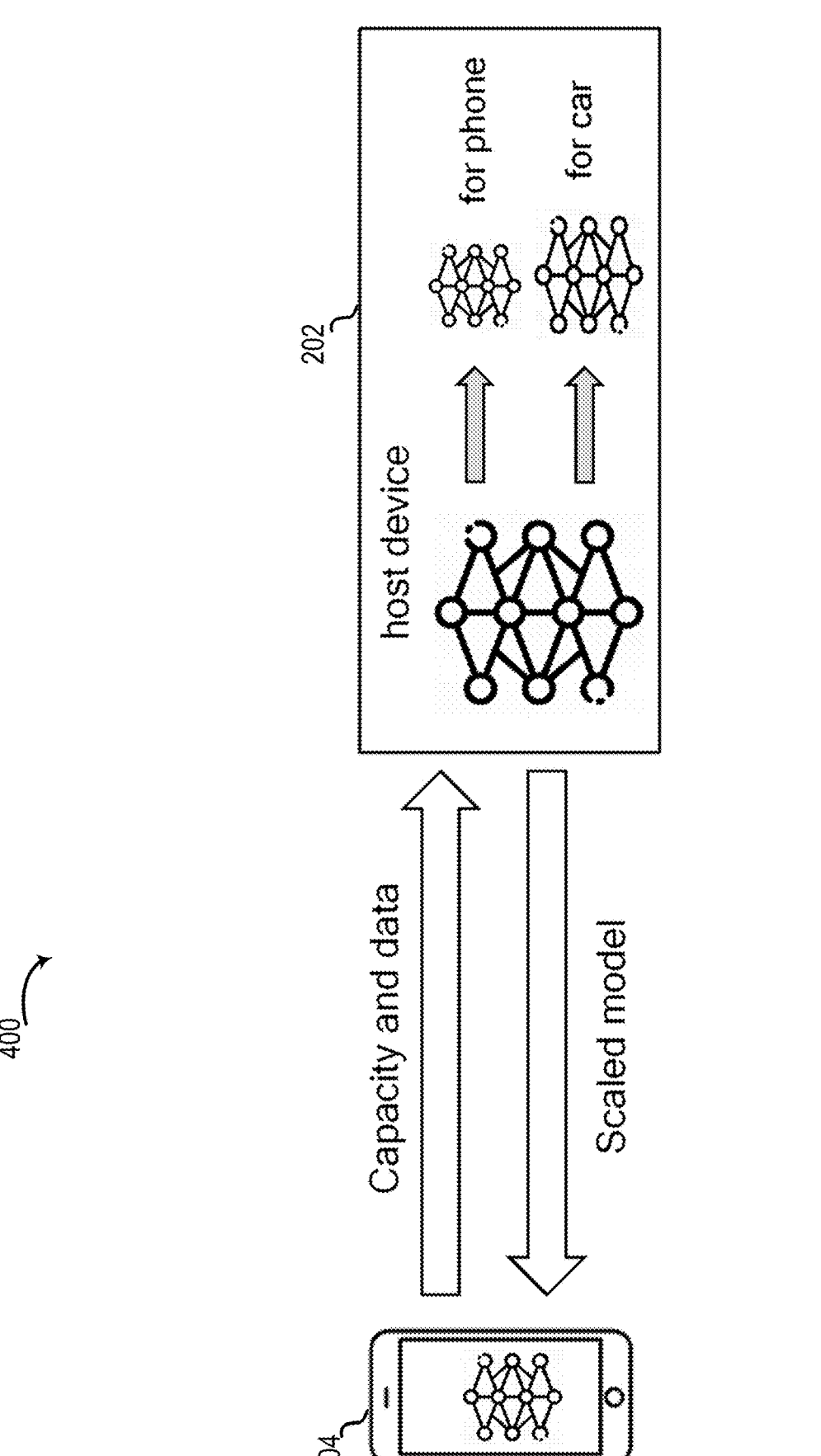
FIG. 4 depicts an example of scaling a machine learning model for a client device in a multi-device network, in accordance with aspects of the present disclosure.

FIG. 4 depicts an example of scaling a machine learning model for a client device (e.g., client device 204A, 204B, or 204C) in a multi-device network, in accordance with aspects of the present disclosure.

Generally, to train a machine learning model, each client device 204 provides both local data captured at client device 204 and capability information to host device 202. The capability information may include, for example, information about the amount of memory at a client device 204 (e.g., total memory, free memory after loading an operating system and other associated software components, memory available at different accelerators installed on the client device (if any), etc.), processing capabilities (a number of operations per second supported by the processor or other data which may be a proxy for the processing capabilities of the client device, such as processor IDs, a number of processing cores, or the like), power utilization properties, and the like. The capability information may be used to scale the machine learning model so that different machine learning models can be deployed to different devices according to the capabilities of these devices. More generally, devices with greater compute capabilities may receive a model that allows for processing of data at higher fidelities (e.g., bit rates, number of quantization bins, etc.) than devices with fewer compute capabilities. In another example, because devices which are connected to larger batteries or mains power sources can draw more power from a power source than devices which are connected to smaller batteries and not connected to a mains power source, the devices connected to larger batteries or mains power sources can be configured with a model that allows for processing of data at higher fidelities (e.g., bit rates, number of quantization bins, etc.) than the models deployed to devices connected to smaller batteries and not connected to mains power.

To train the machine learning model, host device 202 thus receives local data $D_1, D_2, \ldots, D_N$, capability information $C_1, C_2, \ldots, C_N$ for each client device 204, and the desired performance $Acc_1, Acc_2, \ldots, ACC_N$ for models deployed to each client device 204. The resulting model $$M_{host}^{t+1}$$

may be represented by the expression:

$$M_{host}^{t+1} \leftarrow \text{train}(M_{host}^t; D_1, D_2, \ldots, D_N)$$

The resulting model $$M_{host}^{t+1}$$

may be a model trained without respect to the capability information and desired performance defined for each client device 204 in the environment. To customize the model deployed to each client device 204 to take into account the capability information and desired performance for each client device 204, host device 202 can scale (or prune) the trained model $$M_{host}^{t+1}$$

to fit the capability information $C_1, C_2, \ldots, C_N$ for each client device, and the desired performance $Acc_1, Acc_2, \ldots, ACC_N$ for models deployed to each client device.

Generally, a scaled (or pruned) model $$M_i^{t+1},$$

or the model for the $i^{th}$ client device of n total client devices in a multi-device environment, may be represented by the expression:

$$M_i^{t+1} \leftarrow \text{prune } (M_{host}^{t+1}; C_i; Acc_i), i \in \{1 \ldots n\}.$$

In some aspects, a model $$M_i^{t+1}$$

for the $i^{th}$ client device may not achieve the desired performance $Acc_i$, given the capabilities $C_i$. In such a case, the desired performance of the $i^{th}$ client device may be considered the limiting factor on the scaled model generated for each client device. To generate a model that allows for execution according to the desired performance Acc, the capacity may be changed at host device 202 to achieve the desired performance for the model trained for the $i^{th}$ client device 204. The resulting scaled models may then be deployed from the host device 202 to the appropriate client devices 204, with the updated capacity information being mapped to the specific client device 204.

The model may be pruned for each client device 204 using various techniques. For example, a pruned model may be a sub-model, or a portion of, the trained model $$M_{host}^{t+1}.$$

If the trained model $$M_{host}^{t+1}$$

is implemented as a decision tree, for example, the pruned model for a client device 204 may be a model that is shallower than the trained model $$M_{host}^{t+1}$$

such that the depth of the pruned model is less than the depth of the trained model $$M_{host}^{t+1}.$$

In another aspect, where the trained model $$M_{host}^{t+1}$$

is implemented as a neural network, the pruned model for a client device 204 may be a model that includes fewer neurons, fewer layers, or is otherwise smaller than the trained model $$M_{host}^{t+1}.$$

In still further examples, the host device 202 can generate a scaled model for a client device 204 by changing a quantization bin size of the model. Generally, the trained model $$M_{host}^{t+1}$$

may be trained using a number of quantization bins, or categories into which data can be classified. Larger numbers of quantization bins may use larger numbers of bits to represent a classification generated for input data, which may use larger amounts of compute resources in performing inferences on input data. To allow for inferencing to be performed using fewer compute resources, the scaled model can use smaller numbers of larger quantization bins into which data can be classified. By decreasing the number of quantization bins and correspondingly increasing the size of each quantization bin, inferences can be performed using fewer compute resources, as fewer bits may be used to represent a quantization bin, at the expense of inference accuracy.

Figure 5A:
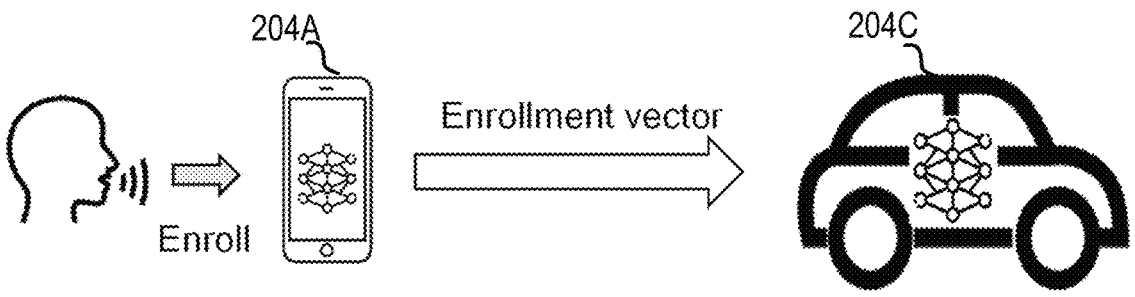
FIG. 5A depicts an example of device enrollment in a multi-device network, in accordance with aspects of the present disclosure.

In some environments, a user may use multiple devices to trigger various operations on one or more client devices in the environment. Because enrollment may be a time-consuming process, and because the client devices in the environment may be configured with a machine learning model trained to generate inferences based on features extracted into a common feature space, some aspects of the present disclosure allow for device-to-device mapping functions to be used in facilitating user enrollment on client devices in the environment. Generally, using these device-to-device mapping functions, as illustrated in FIG. 5A, a user may enroll on a first client device 204A, and the enrollment information (e.g., an enrollment vector) may be transferred to other client devices (e.g., second client device 204C) in the environment.

To allow a user to enroll on multiple client devices 204 using an enrollment process on a single device, the properties or characteristics of each client device 204 may be used to transform the enrollment vector from a vector appropriate for a first client device to a vector appropriate for a second client device via a mapping function between the first client device and the second client device. The mapping function may be, for example, implemented via a non-parametric model, an autoencoder model, a generative adversarial model (GAN), or other models that allow for conversion from data generated by a machine learning model on the first client device to data that would be generated by a machine learning model on the second client device.

Figure 5B:
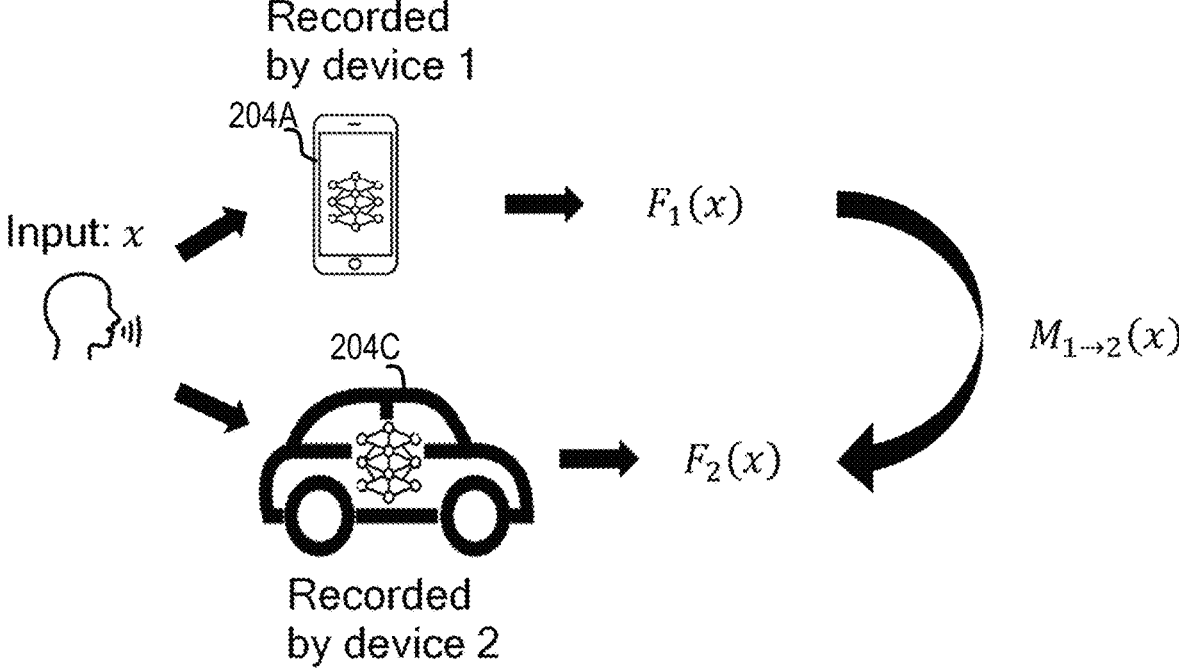
FIG. 5B depicts an example device-to-device mapping in a machine learning model used to perform inferences in a multi-device network, in accordance with aspects of the present disclosure.

FIG. 5B depicts an example device-to-device mapping in a machine learning model used to perform inferences in a multi-device network, in accordance with aspects of the present disclosure.

As illustrated, an input x may be received at client devices 204A and 204C. Client device 204A can generate an impulse response $F_1(x)$ for input x, and client device 204C can generate an impulse response $F_2(x)$ for the input x. To use the enrollment vector for input x generated by client device 204A at client device 204C, x may be transformed to $$F_2\left(F_1^{-1}(x)\right)$$

using a mapping function $M_{1\to2}(x)$. In one example, where the mapping function $M_{1\to2}(x)$ is implemented as a GAN, the impulse responses $F_1(x)$ and $F_2(x)$ may be recorded in parallel. The impulse response for each of client devices 204A and 204C generally embeds various features of the client devices 204A and 204C, such as the device functions at each device, the quality of the capture components at each device, and so on. A neural network may be trained, using the pair of impulse responses $F_1(x)$ and $F_2(x)$, to generate two mapping functions. The first mapping function may map an impulse response from a first client device to that of a second client device (e.g., according to the expression $M_{1\to2}(x)$), and the second mapping function may map an impulse response from a second client device to a first client device (e.g., according to the expression $M_{2\to1}(x)$).

Figure 6A:
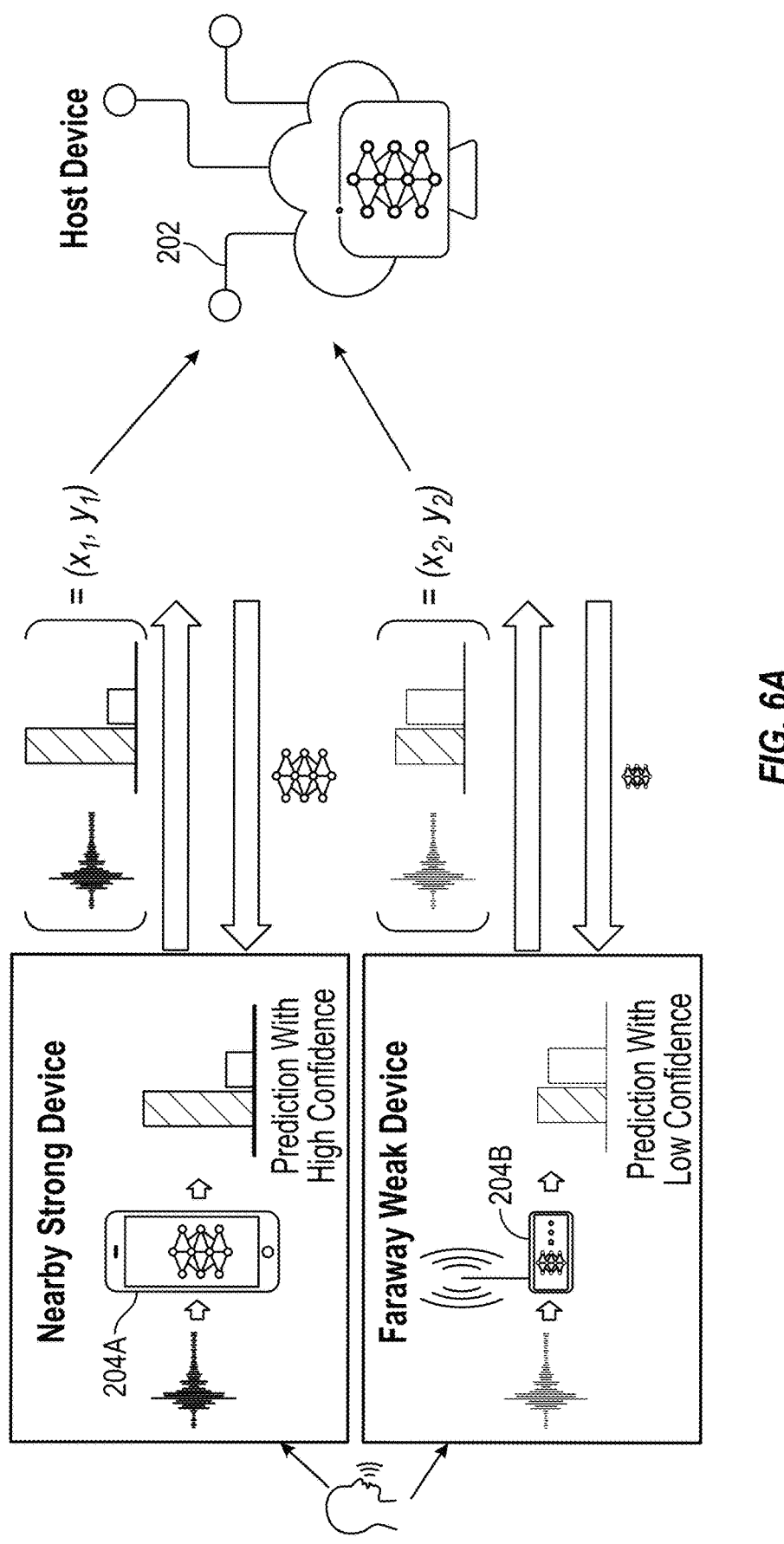
FIGS. 6A and 6B depict example interactions between a host device and two client devices to train a machine learning model to generate inferences based on data from different devices encoded into a common feature space, in accordance with aspects of the present disclosure.
Figure 6B:
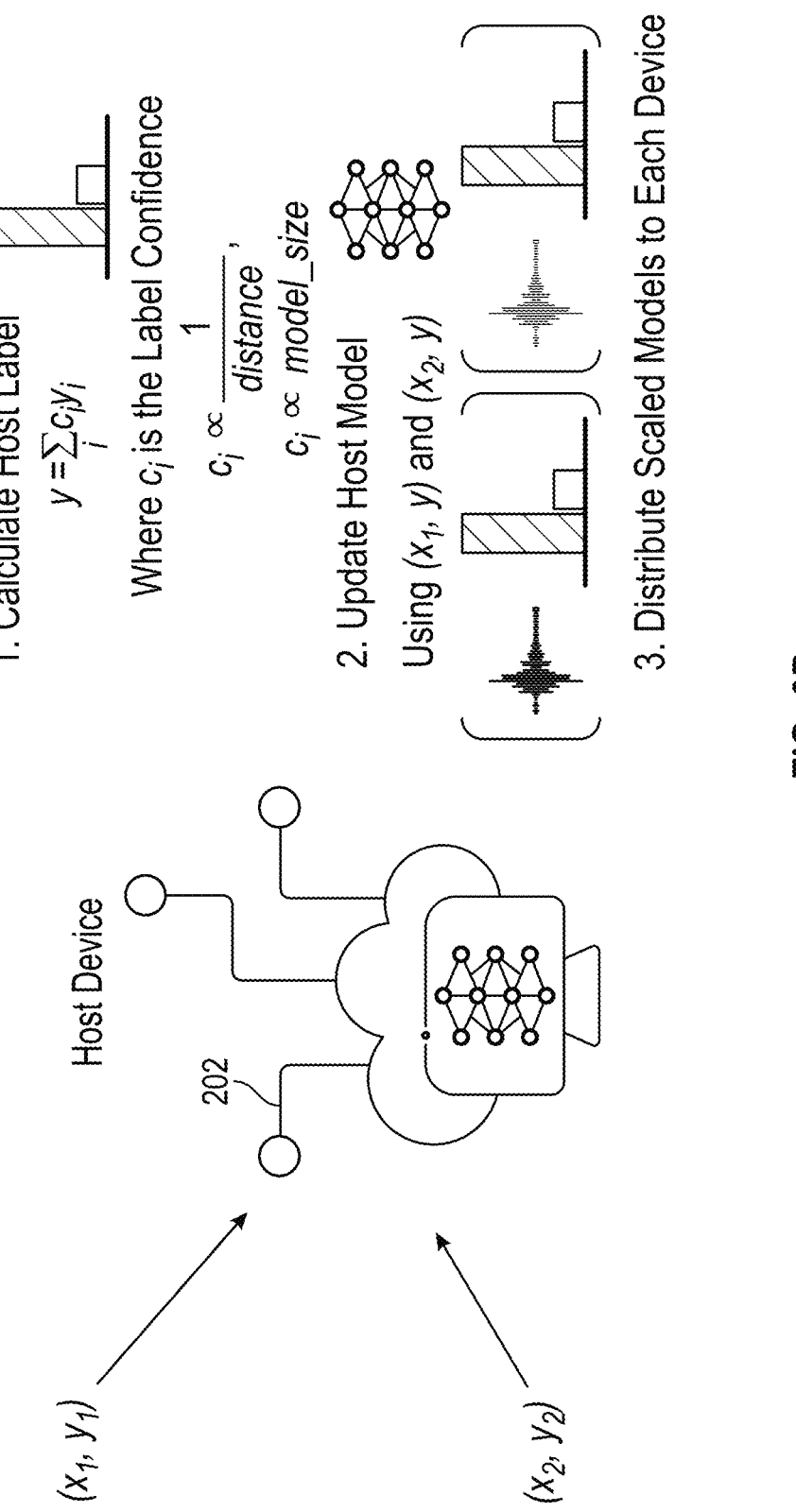

In some aspects, devices in a multi-device network environment can teach each other via knowledge distillation and continuous learning. FIGS. 6A and 6B depict example interactions between a host device (e.g., host device 202) and two client devices (e.g., two of client devices 204A, 204B, or 204C) to train a machine learning model to generate inferences based on data from different devices encoded into a common feature space, in accordance with aspects of the present disclosure.

As illustrated in FIG. 6A, devices in a multi-device environment may capture the same input with different signal-to-noise ratios (or other quality metrics). In this example, client device 204A may be closer in proximity to the source of a data input than client device 204B, and thus, the quality of the captured input at client device 204A may be greater than the quality of the captured input at client device 204B. Thus, the machine learning models deployed at client device 204A may generate a prediction with a higher confidence level than the machine learning models deployed at client device 204B. To transfer knowledge from the stronger device (e.g., client device 204A) to the weaker device (e.g., client device 204B), host device 202 can use the captured inputs and inferences generated by client devices 204A and 204B to generate an update to a global machine learning model and distribute scaled models to the client devices 204 in a multi-device network.

As illustrated in FIG. 6B, a host device 202 thus receives the two-tuple of input x and inference y from the first client device 204A, designated $(x_1, y_1)$, and the two-tuple of input x and inference y from the second client device 204B, designated $(x_2, y_2)$. In teaching peer client devices in a multi-device environment, host device 202 can calculate a host label y for the input x according to the equation:

$$y = \sum_i c_i y_i$$

where $c_i$ represents the confidence level associated with the inference $y_i$ generated by the $i^r$ client device. The confidence level $c_i$ may follow the following properties:

$$c_i \propto \frac{1}{distance} \text{ and } c_i \propto modelSize$$

Thus, the confidence level may be proportional to the inverse of the distance between the input data source and the $i^{th}$ client device and may be proportional to the size of the model. Therefore, devices that are closer to the input source may be used to teach devices that are further away, as an inference generated by a device closer to the input source (and thus with a higher confidence level) may have knowledge, such as intermediate features, output softmax distributions, and the like, that can be used as teaching information for weaker devices. Similarly, devices with larger models can have better recognition results, and thus may also be used to teach other devices with smaller, and therefore weaker, models.

After the updated model is scaled for each client device according to the capability information and the target performance information associated with each client device 204 in the multi-device environment, the scaled updated models may be distributed to the client devices 204 for use in performing subsequent inferences.

Example Operations for Training Machine Learning Models for Multiple Client Devices in a Network FIG. 7 shows an example of a method 700 for training machine learning models for multiple client devices in a network, in accordance with aspects of the present disclosure. In some examples, the method 700 may be performed by a host device (e.g., host device 202 illustrated in FIGS. 2-6B).

As illustrated, method 700 begins at block 705 with extracting a feature set from a data set associated with a client device (e.g., client device 204A, 204B, or 204C) using a client-device-specific feature extractor, wherein the feature set comprises a subset of features in a common feature space. In some cases, the operations of this block refer to, or may be performed by, circuitry for extracting and/or code for extracting as described with reference to FIG. 9.

Method 700 then proceeds to block 710 with training a task-specific model based on the extracted feature set and one or more other feature sets associated with other client devices, wherein the feature sets associated with the other client devices comprise one or more subsets of features in the common feature space. In some cases, the operations of this block refer to, or may be performed by, circuitry for training and/or code for training as described with reference to FIG. 9.

Method 700 then proceeds to block 715 with deploying, to each respective client device of a plurality of client devices, a respective version of the task-specific model. In some cases, the operations of this block refer to, or may be performed by, circuitry for deploying and/or code for deploying as described with reference to FIG. 9.

In some aspects, the client-device-specific feature extractor is associated with a class of devices having common capabilities.

In some aspects, the method 700 further includes training the client-device-specific feature extractor to extract a same set of features from inputs having a same label generated by the plurality of client devices. In some cases, the operations of this block refer to, or may be performed by, circuitry for training and/or code for training as described with reference to FIG. 9.

In some aspects, the method 700 further includes, for each respective client device, generating the respective version of the task-specific model based on capability information and target performance associated with the respective client device. In some cases, the operations of this block refer to, or may be performed by, circuitry for generating and/or code for generating as described with reference to FIG. 9. In some aspects, generating the respective version of the task-specific model comprises pruning (or scaling) the model based on the capability information and the target performance such that the pruned model comprises a portion of the task-specific model (e.g., as discussed above with respect to FIG. 4). As discussed, pruning (or scaling) the model generally includes various techniques that result in the scaled model being smaller than the task-specific model, such as a model with a smaller depth than that of the task-specific model, a model with fewer convolutional layers or fewer neurons than the task-specific model, or the like. More generally, a pruned model may allow for inferences to be performed using fewer compute resources than the amount of compute resources used for inferencing using the task-specific model. In some aspects, generating the respective version of the task-specific model comprises adjusting quantization bin sizes for the respective version of the task-specific model such that the quantization bin sizes for the respective version of the task-specific model are associated with larger bins than a corresponding quantization bin size for the task-specific model (e.g., as discussed above with respect to FIG. 4).

In some aspects, the method 700 further includes receiving an indication that performance of the respective version of the task-specific model for the respective client device fails to meet the target performance for the respective client device, generating a revised respective version of the task-specific model based on the received indication, and deploying the revised respective version of the task-specific model to the respective client device. In some cases, the operations of this block refer to, or may be performed by, circuitry for receiving and/or code for receiving as described with reference to FIG. 9. In some aspects, the revised respective version of the task-specific model comprises a pruned version of the respective version of the task-specific model. In some aspects, the revised respective version of the task-specific model comprises a version of the task-specific model having quantization bins associated with larger bin sizes than bin sizes associated with the respective version of the task-specific model.

In some aspects, the method 700 further includes generating a mapping between a first type of client device and a second type of client device. In some cases, the operations of this block refer to, or may be performed by, circuitry for generating and/or code for generating as described with reference to FIG. 9. In some aspects, the mapping comprises a function transforming an input associated with the first type of client device to an input associated with the second type of client device.

In some aspects, the method 700 further includes training a machine learning model to map inputs from a client device of the first type to inputs from a client device of the second type based on device properties, samples generated by the client device of the first type, and samples generated by the client device of the second type. In some cases, the operations of this block refer to, or may be performed by, circuitry for training and/or code for training as described with reference to FIG. 9.

In some aspects, the method 700 further includes training a machine learning model to map inputs from a first type of client device or a second type of client device to inputs from any client device of the plurality of client devices based on device properties, samples generated by the client device of the first type, and samples generated by the client device of the second type. In some cases, the operations of this block refer to, or may be performed by, circuitry for training and/or code for training as described with reference to FIG. 9.

In some aspects, the method 700 further includes calculating a common label based on data from the client device and data from another client device, updating the task-specific model based on a first pairing between the data from the client device and the common label and a second pairing between the data from the other client device and the common label, and deploying the updated task-specific model to the client device and the other client device. In some cases, the operations of this block refer to, or may be performed by, circuitry for calculating, circuitry for updating, circuitry for deploying and/or code for calculating, code for updating, and code for deploying as described with reference to FIG. 9.

In some aspects, the data from the client device comprises a label generated for an input by the client device and a confidence level associated with the label.

In some aspects, the confidence level associated with the label is based on at least one of a distance between the client device and the host device, a model size associated with the client device, model sizes associated with the plurality of client devices, or a signal-to-noise ratio (SNR) associated with the input by the client device.

In some aspects, the plurality of client devices includes the client device.

In some aspects, the plurality of client devices may include client devices that are members of a trusted ecosystem. These client devices may enroll as part of the trusted ecosystem prior to participating in training of the machine learning model.

Figure 8:
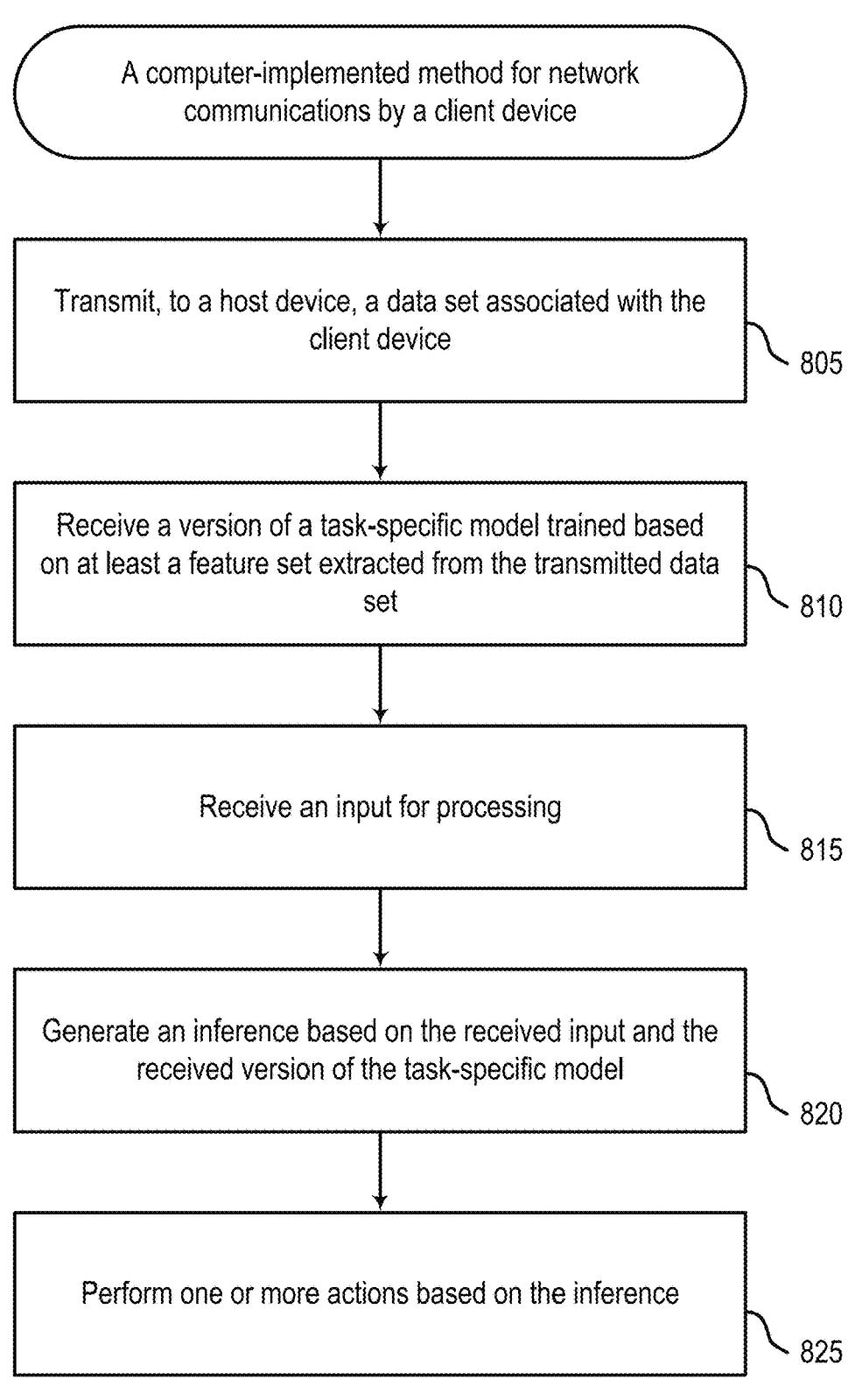
FIG. 8 depicts example operations which may be performed for generating inferences from input data using a machine learning model trained for multiple client devices, in accordance with aspects of the present disclosure.

Example Operations for Generating Inferences Using a Machine Learning Model Trained for Multiple Client Devices FIG. 8 shows an example of a method 800 for generating inferences from input data using a machine learning model trained for multiple client devices, in accordance with aspects of the present disclosure. In some examples, the method 800 may be performed by a client device, such as client device 204 (e.g., 204A, 204B, or 204C) illustrated in FIGS. 2-6B.

As illustrated, method 800 begins at block 805 with transmitting, to a host device (e.g., host device 202), a data set associated with the client device. In some cases, the operations of this block refer to, or may be performed by, circuitry for transmitting and/or code for transmitting as described with reference to FIG. 10.

Method 800 then proceeds to block 810 with receiving a version of a task-specific model trained based on at least a feature set extracted from the transmitted data set. In some cases, the operations of this block refer to, or may be performed by, circuitry for receiving and/or code for receiving as described with reference to FIG. 10.

Method 800 then proceeds to block 815 with receiving an input for processing. In some cases, the operations of this block refer to, or may be performed by, circuitry for receiving and/or code for receiving as described with reference to FIG. 10.

Method 800 then proceeds to block 820 with generating an inference based on the received input and the received version of the task-specific model. In some cases, the operations of this block refer to, or may be performed by, circuitry for generating and/or code for generating as described with reference to FIG. 10.

Method 800 then proceeds to block 825 with performing one or more actions based on the inference. In some cases, the operations of this block refer to, or may be performed by, circuitry for performing and/or code for performing as described with reference to FIG. 10.

In some aspects, the version of the task-specific model is based on capability information and target performance associated with the client device.

In some aspects, the version of the task-specific model comprises a pruned version of the task-specific model, such that the pruned model comprises a portion of the task-specific model.

In some aspects, the version of the task-specific model comprises a version of the task-specific model having quantization bins associated with larger bin sizes than bin sizes associated with the respective version of the task-specific model.

In some aspects, the method 800 further includes transmitting, to the host device, an indication that performance of the version of the task-specific model for the client device fails to meet the target performance for the client device. In some cases, the operations of this block refer to, or may be performed by, circuitry for transmitting and/or code for transmitting as described with reference to FIG. 10.

In some aspects, the method 800 further includes receiving, from the host device, a revised version of the task-specific model based on the indication. In some cases, the operations of this block refer to, or may be performed by, circuitry for receiving and/or code for receiving as described with reference to FIG. 10.

In some aspects, the revised version of the task-specific model comprises a pruned version of the task-specific model.

In some aspects, the revised version of the task-specific model comprises another version of the task-specific model having quantization bins associated with larger bin sizes than bin sizes associated with the revised version of the task-specific model In some aspects, the method 800 further includes receiving an updated task-specific model, wherein the updated task-specific model is based on: a common label based on data from the client device and data from another client device, and a first pairing between the data from the client device and the common label and a second pairing between the data from the other client device and the common label. In some cases, the operations of this block refer to, or may be performed by, circuitry for receiving and/or code for receiving as described with reference to FIG. 10.

In some aspects, the data from the client device comprises a label generated for an input by a client device and a confidence level associated with the label.

In some aspects, the confidence level associated with the label is based on at least one of a distance between the client device and the host device, a model size associated with the client device, model sizes associated with the plurality of client devices, or a signal-to-noise ratio (SNR) associated with the input by the client device.

Figure 9:
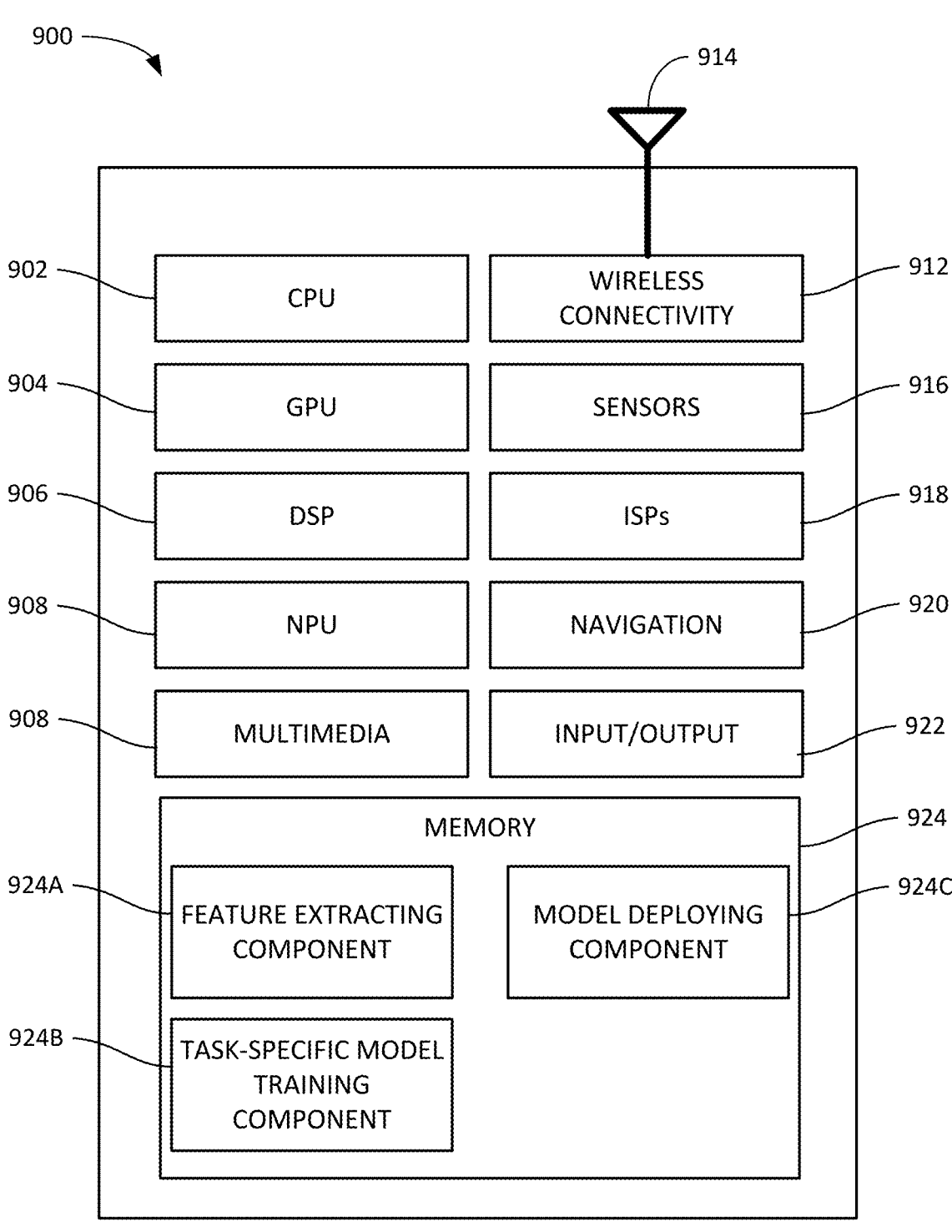
FIG. 9 depicts an example implementation of a processing system on which a machine learning model is trained for multiple client devices in a network, according to aspects of the present disclosure.

Example Processing Systems for Training and Generating Inferences Using Machine Learning Models for Trained Multiple Client Devices FIG. 9 depicts an example processing system 900 for training a machine learning model for multiple client devices in a network, such as described herein for example with respect to FIG. 7.

Processing system 900 includes a central processing unit (CPU) 902, which in some examples may be a multi-core CPU. Instructions executed at the CPU 902 may be loaded, for example, from a program memory associated with the CPU 902 or may be loaded from a memory 924.

Processing system 900 also includes additional processing components tailored to specific functions, such as a graphics processing unit (GPU) 904, a digital signal processor (DSP) 906, a neural processing unit (NPU) 908, a multimedia processing unit 910, a wireless connectivity component 912.

An NPU, such as 908, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPUs), neural network processor (NNP), intelligence processing unit (IPU), vision processing unit (VPU), or graph processing unit.

NPUs, such as 908, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the plurality of NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this new piece through an already trained model to generate a model output (e.g., an inference).

In one implementation, NPU 908 is a part of one or more of CPU 902, GPU 904, and/or DSP 906.

In some examples, wireless connectivity component 912 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity component 912 is further connected to one or more antennas 914.

Processing system 900 may also include one or more sensor processing units 916 associated with any manner of sensor, one or more image signal processors (ISPs) 918 associated with any manner of image sensor, and/or a navigation processor 920, which may include satellite-based positioning system components (e.g., GPS or GLONASS) as well as inertial positioning system components.

Processing system 900 may also include one or more input and/or output devices 922, such as screens, touch-sensitive surfaces (including touch-sensitive displays), physical buttons, speakers, microphones, and the like.

In some examples, one or more of the processors of processing system 900 may be based on an ARM or RISC-V instruction set.

Processing system 900 also includes memory 924, which is representative of one or more static and/or dynamic memories, such as a dynamic random access memory, a flash-based static memory, and the like. In this example, memory 924 includes computer-executable components, which may be executed by one or more of the aforementioned processors of processing system 900.

In particular, in this example, memory 924 includes feature extracting component 924A, task-specific model training component 924B, and model deploying component 924C. The depicted components, and others not depicted, may be configured to perform various aspects of the methods described herein.

Generally, processing system 900 and/or components thereof may be configured to perform the methods described herein.

Notably, in other aspects, aspects of processing system 900 may be omitted, such as where processing system 900 is a server computer or the like. For example, multimedia processing unit 910, wireless connectivity component 912, sensor processing units 916, ISPs 918, and/or navigation processor 920 may be omitted in other aspects. Further, aspects of processing system 900 may be distributed, such as training a model and using the model to generate inferences, such as user verification predictions.

Figure 10:
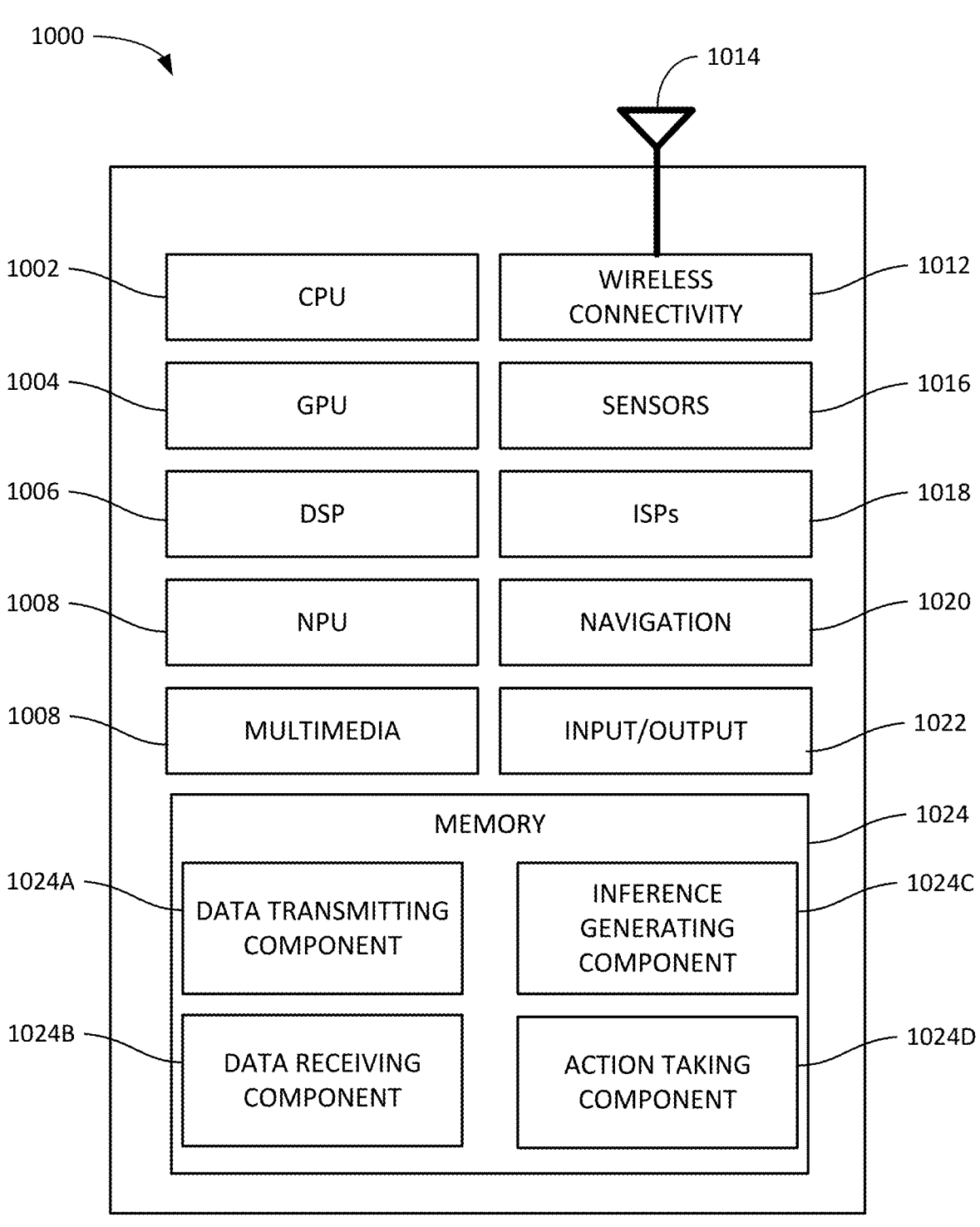
FIG. 10 depicts an example implementation of a processing system on which a machine learning model trained for multiple client devices is used to generate inferences from input data, according to aspects of the present disclosure.

FIG. 10 depicts an example processing system 1000 for generating inferences using a machine learning model trained for multiple client devices in a network, such as described herein for example with respect to FIG. 8.

Processing system 1000 includes a central processing unit (CPU) 1002, which in some examples may be a multi-core CPU. Instructions executed at the CPU 1002 may be loaded, for example, from a program memory associated with the CPU 1002 or may be loaded from a memory 1024.

Processing system 1000 also includes additional processing components tailored to specific functions, such as a graphics processing unit (GPU) 1004, a digital signal processor (DSP) 1006, a neural processing unit (NPU) 1008, a multimedia processing unit 1010, a wireless connectivity component 1012.

An NPU, such as 1008, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPUs), neural network processor (NNP), intelligence processing unit (IPU), vision processing unit (VPU), or graph processing unit.

NPUs, such as 1008, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the plurality of NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this new piece through an already trained model to generate a model output (e.g., an inference).

In one implementation, NPU 1008 is a part of one or more of CPU 1002, GPU 1004, and/or DSP 1006.

In some examples, wireless connectivity component 1012 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity component 1012 is further connected to one or more antennas 1014.

Processing system 1000 may also include one or more sensor processing units 1016 associated with any manner of sensor, one or more image signal processors (ISPs) 1018 associated with any manner of image sensor, and/or a navigation processor 1020, which may include satellite-based positioning system components (e.g., GPS or GLONASS) as well as inertial positioning system components.

Processing system 1000 may also include one or more input and/or output devices 1022, such as screens, touch-sensitive surfaces (including touch-sensitive displays), physical buttons, speakers, microphones, and the like.

In some examples, one or more of the processors of processing system 1000 may be based on an ARM or RISC-V instruction set.

Processing system 1000 also includes memory 1024, which is representative of one or more static and/or dynamic memories, such as a dynamic random access memory, a flash-based static memory, and the like. In this example, memory 1024 includes computer-executable components, which may be executed by one or more of the aforementioned processors of processing system 1000.

In particular, in this example, memory 1024 includes data transmitting component 1024A, data receiving component 1024B, inference generating component 1024C, and action taking component 1024D. The depicted components, and others not depicted, may be configured to perform various aspects of the methods described herein.

Generally, processing system 1000 and/or components thereof may be configured to perform the methods described herein.

Notably, in other aspects, aspects of processing system 1000 may be omitted, such as where processing system 1000 is a server computer or the like. For example, multimedia processing unit 1010, wireless connectivity component 1012, sensor processing units 1016, ISPs 1018, and/or navigation processor 1020 may be omitted in other aspects. Further, aspects of processing system 1000 may be distributed, such as training a model and using the model to generate inferences, such as user verification predictions.

Example Clauses

Implementation details of various aspects of the present disclosure are described in the following numbered clauses.

Clause 1: A computer-implemented method for network communications by a host device, comprising: extracting a feature set from a data set associated with a client device using a client-device-specific feature extractor, wherein the feature set comprises a subset of features in a common feature space; training a task-specific model based on the extracted feature set and one or more other feature sets associated with other client devices, wherein the feature sets associated with the other client devices comprise one or more subsets of features in the common feature space; and deploying, to each respective client device of a plurality of client devices, a respective version of the task-specific model.

Clause 2: The method of Clause 1, wherein the client-device-specific feature extractor is associated with a class of devices having common capabilities.

Clause 3: The method of Clause 1 or 2, further comprising training the client-device-specific feature extractor to extract a same set of features from inputs having a same label generated by the plurality of client devices.

Clause 4: The method of any of Clauses 1-3, further comprising, for each respective client device, generating the respective version of the task-specific model based on capability information and target performance associated with the respective client device.

Clause 5: The method of Clause 4, wherein generating the respective version of the task-specific model comprises pruning the model based on the capability information and the target performance such that the pruned model comprises a portion of the task-specific model.

Clause 6: The method of Clause 4 or 5, wherein generating the respective version of the task-specific model comprises adjusting quantization bin sizes for the respective version of the task-specific model such that the quantization bin sizes for the respective version of the task-specific model are associated with larger bins than a corresponding quantization bin size for the task-specific model.

Clause 7: The method of any of Clauses 4-6, further comprising: receiving an indication that performance of the respective version of the task-specific model for the respective client device fails to meet the target performance for the respective client device; generating a revised respective version of the task-specific model based on the received indication; and deploying the revised respective version of the task-specific model to the respective client device.

Clause 8: The method of Clause 7, wherein the revised respective version of the task-specific model comprises a pruned version of the respective version of the task-specific model.

Clause 9: The method of Clause 7 or 8, wherein the revised respective version of the task-specific model comprises a version of the task-specific model having quantization bins associated with larger bin sizes than bin sizes associated with the respective version of the task-specific model.

Clause 10: The method of any of Clauses 1-9, further comprising generating a mapping between a first type of client device and a second type of client device.

Clause 11: The method of Clause 10, wherein the mapping comprises a function transforming an input associated with the first type of client device to an input associated with the second type of client device.

Clause 12: The method of Clause 10 or 11, further comprising training a machine learning model to map inputs from a client device of the first type to inputs from a client device of the second type based on device properties, samples generated by the client device of the first type, and samples generated by the client device of the second type.

Clause 13: The method of any of Clauses 10-12, further comprising training a machine learning model to map inputs from a first type of client device or a second type of client device to inputs from any client device of the plurality of client devices based on device properties, samples generated by the client device of the first type, and samples generated by the client device of the second type.

Clause 14: The method of any of Clauses 1-13, further comprising: calculating a common label based on data from the client device and data from another client device; updating the task-specific model based on a first pairing between the data from the client device and the common label and a second pairing between the data from the other client device and the common label; and deploying the updated task-specific model to the client device and the other client device.

Clause 15: The method of Clause 14, wherein the data from the client device comprises a label generated for an input by the client device and a confidence level associated with the label.

Clause 16: The method of Clause 15, wherein the confidence level associated with the label is based on at least one of a distance between the client device and the host device, a model size associated with the client device, model sizes associated with the plurality of client devices, or a signal-to-noise ratio (SNR) associated with the input by the client device.

Clause 17: The method of any of Clauses 1-16, wherein the plurality of client devices includes the client device.

Clause 18: The method of any of Clauses 1-17, further comprising enrolling the plurality of client devices into a trusted ecosystem, wherein only devices in the trusted ecosystem are allowed to participate in training the task-specific model.

Clause 19: A computer-implemented method for network communications by a client device, comprising: transmitting, to a host device, a data set associated with the client device; receiving a version of a task-specific model trained based on at least a feature set extracted from the transmitted data set; receiving an input for processing; generating an inference based on the received input and the received version of the task-specific model; and performing one or more actions based on the inference.

Clause 20: The method of Clause 19, wherein the version of the task-specific model is based on capability information and target performance associated with the client device.

Clause 21: The method of Clause 19 or 20, wherein the version of the task-specific model comprises a pruned version of the task-specific model, such that the pruned model comprises a portion of the task-specific model.

Clause 22: The method of Clause 19 or 20, wherein the version of the task-specific model comprises a version of the task-specific model having quantization bins associated with larger bin sizes than bin sizes associated with the task-specific model.

Clause 23: The method of any of Clauses 19-22, further comprising: transmitting, to the host device, an indication that performance of the version of the task-specific model for the client device fails to meet the target performance for the client device; and receiving, from the host device, a revised version of the task-specific model based on the indication.

Clause 24: The method of Clause 23, wherein the revised version of the task-specific model comprises a pruned version of the task-specific model.

Clause 25: The method of Clause 23 or 24, wherein the revised version of the task-specific model comprises another version of the task-specific model having quantization bins associated with larger bin sizes than bin sizes associated with the version of the task-specific model.

Clause 26: The method of Clause 23 or 24, further comprising receiving an updated task-specific model, wherein the updated task-specific model is based on: a common label based on data from the client device and data from another client device, and a first pairing between the data from the client device and the common label and a second pairing between the data from the other client device and the common label.

Clause 27: The method of Clause 26, wherein the data from the client device comprises a label generated for an input by a client device and a confidence level associated with the label.

Clause 28: The method of Clause 26 or 27, wherein the confidence level associated with the label is based on at least one of a distance between the client device and the host device, a model size associated with the client device, model sizes associated with the plurality of client devices, or a signal-to-noise ratio (SNR) associated with the input by the client device.

Clause 29: A processing system, comprising: a memory having executable instructions stored thereon; and a processor configured to execute the executable instructions in order to cause the processing system to perform a method in accordance with any of Clauses 1 through 28.

Clause 30: A processing system, comprising: means for performing a method in accordance with any of Clauses 1 through 27.

Clause 31: A non-transitory computer-readable medium having instructions stored thereon that, when executed by one or more processors of a processing system, cause the processing system to performs a method in accordance with any of Clauses 1 through 28.

Clause 32: A computer program product embodied on a computer-readable storage medium comprising code for performing a method in accordance with any of Clauses 1 through 28.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for network communications by a host device, comprising:

extracting a feature set from a data set associated with a client device using a client-device-specific feature extractor, wherein the feature set comprises a subset of features in a common feature space;

training a task-specific model based on the extracted feature set and one or more other feature sets associated with other client devices, wherein the other feature sets associated with the other client devices comprise one or more subsets of features in the common feature space; and deploying, to each respective client device of a plurality of client devices, a respective version of the task-specific model.

2. The method of claim 1, wherein the client-device-specific feature extractor is associated with a class of devices having common capabilities.

3. The method of claim 1, further comprising training the client-device-specific feature extractor to extract a same set of features from inputs having a same label generated by the plurality of client devices.

4. The method of claim 1, further comprising, for each respective client device, generating the respective version of the task-specific model based on capability information and target performance associated with the respective client device.

5. The method of claim 4, wherein generating the respective version of the task-specific model comprises pruning the model based on the capability information and the target performance such that the pruned model comprises a portion of the task-specific model.

6. The method of claim 4, wherein generating the respective version of the task-specific model comprises adjusting quantization bin sizes for the respective version of the task-specific model such that the quantization bin sizes for the respective version of the task-specific model are associated with larger bins than a corresponding quantization bin size for the task-specific model.

7. The method of claim 4, further comprising:

receiving an indication that performance of the respective version of the task-specific model for the respective client device fails to meet the target performance for the respective client device;

generating a revised respective version of the task-specific model based on the received indication; and deploying the revised respective version of the task-specific model to the respective client device.

8. The method of claim 7, wherein the revised respective version of the task-specific model comprises a pruned version of the respective version of the task-specific model.

9. The method of claim 7, wherein the revised respective version of the task-specific model comprises a version of the task-specific model having quantization bins associated with larger bin sizes than bin sizes associated with the respective version of the task-specific model.

10. The method of claim 1, further comprising generating a mapping between a first type of client device and a second type of client device.

11. The method of claim 10, wherein the mapping comprises a function transforming an input associated with the first type of client device to an input associated with the second type of client device.

12. The method of claim 10, further comprising training a machine learning model to map inputs from a client device of the first type to inputs from a client device of the second type based on device properties, samples generated by the client device of the first type, and samples generated by the client device of the second type.

13. The method of claim 10, further comprising training a machine learning model to map inputs from a first type of client device or a second type of client device to inputs from any client device of the plurality of client devices based on device properties, samples generated by the client device of the first type, and samples generated by the client device of the second type.

14. The method of claim 1, further comprising:

calculating a common label based on data from the client device and data from another client device;

updating the task-specific model based on a first pairing between the data from the client device and the common label and a second pairing between the data from the other client device and the common label; and deploying the updated task-specific model to the client device and the other client device.

15. The method of claim 14, wherein the data from the client device comprises a label generated for an input by the client device and a confidence level associated with the label.

16. The method of claim 15, wherein the confidence level associated with the label is based on at least one of a distance between the client device and the host device, a model size associated with the client device, model sizes associated with the plurality of client devices, or a signal-to-noise ratio (SNR) associated with the input by the client device.

17. The method of claim 1, wherein the plurality of client devices includes the client device.

18. The method of claim 1, further comprising enrolling the plurality of client devices into a trusted ecosystem, wherein only devices in the trusted ecosystem are allowed to participate in training the task-specific model.

19. A computer-implemented method for network communications by a client device, comprising:

transmitting, to a host device, a data set associated with the client device;

receiving a version of a task-specific model trained based on at least a feature set extracted from the transmitted data set;

receiving an input for processing;

generating an inference based on the received input and the received version of the task-specific model; and performing one or more actions based on the inference.

20. The method of claim 19, wherein the version of the task-specific model is based on capability information and target performance associated with the client device.

21. The method of claim 20, wherein the version of the task-specific model comprises a pruned version of the task-specific model, such that the pruned model comprises a portion of the task-specific model.

22. The method of claim 20, wherein the version of the task-specific model comprises a version of the task-specific model having quantization bins associated with larger bin sizes than bin sizes associated with the task-specific model.

23. The method of claim 20, further comprising:

transmitting, to the host device, an indication that performance of the version of the task-specific model for the client device fails to meet the target performance for the client device; and receiving, from the host device, a revised version of the task-specific model based on the indication.

24. The method of claim 23, wherein the revised version of the task-specific model comprises a pruned version of the task-specific model.

25. The method of claim 23, wherein the revised version of the task-specific model comprises another version of the task-specific model having quantization bins associated with larger bin sizes than bin sizes associated with the version of the task-specific model.

26. The method of claim 19, further comprising receiving an updated task-specific model, wherein the updated task-specific model is based on:

a common label based on data from the client device and data from another client device, and a first pairing between the data from the client device and the common label and a second pairing between the data from the other client device and the common label.

27. The method of claim 26, wherein the data from the client device comprises a label generated for an input by a client device and a confidence level associated with the label.

28. The method of claim 27, wherein the confidence level associated with the label is based on at least one of a distance between the client device and the host device, a model size associated with the client device, model sizes associated with a plurality of client devices, or a signal-to-noise ratio (SNR) associated with the input by the client device.

29. A host device comprising:

memory having executable instructions stored thereon; and one or more processors configured to execute the executable instructions in order to cause the host device to:

extract a feature set from a data set associated with a client device using a client-device-specific feature extractor, wherein the feature set comprises a subset of features in a common feature space;

train a task-specific model based on the extracted feature set and one or more other feature sets associated with other client devices, wherein the other feature sets associated with the other client devices comprise one or more subsets of features in the common feature space; and deploy, to each respective client device of a plurality of client devices, a respective version of the task-specific model.

30. A client device comprising:

memory having executable instructions stored thereon; and one or more processors configured to execute the executable instructions in order to cause the client device to:

transmit, to a host device, a data set associated with the client device;

receive a version of a task-specific model trained based on at least a feature set extracted from the transmitted data set;

receive an input for processing;

generate an inference based on the received input and the received version of the task-specific model; and perform one or more actions based on the inference.

\* \* \* \* \*